United States Patent [19]

Banks

[11] Patent Number: 5,626,405

[45] Date of Patent: May 6, 1997

[54] UNIVERSAL TRAVEL SLIDE

[76] Inventor: Ridgway M. Banks, 7411 Park Vista, El Cerrito, Calif. 94530

[21] Appl. No.: 547,258

[22] Filed: Oct. 24, 1995

[51] Int. Cl.⁶ .................................................. A47B 88/00
[52] U.S. Cl. .................. 312/334.8; 312/334.16; 312/334.44; 312/334.46
[58] Field of Search .................. 312/334.8, 334.13, 312/334.15, 334.44, 334.16, 334.23, 334.24, 334.27, 334.28, 334.46; 384/17, 23, 42

[56] References Cited

U.S. PATENT DOCUMENTS

| Re. 3,761 | 12/1869 | Olds | 384/17 |
|---|---|---|---|
| 2,277,702 | 3/1942 | Kennedy | 312/334.46 X |
| 4,072,375 | 2/1978 | Boone . | |
| 4,384,746 | 5/1983 | Ferdinand et al. . | |
| 4,936,691 | 6/1990 | Reiss, Jr. | 384/17 |
| 5,085,524 | 2/1992 | Reiss, Jr. | 384/17 |
| 5,209,572 | 5/1993 | Jordan | 384/18 |

FOREIGN PATENT DOCUMENTS

| 4334611 | 4/1994 | Germany | 384/42 |
|---|---|---|---|
| 94024444 | 10/1994 | WIPO | 384/42 |

OTHER PUBLICATIONS

Accuride Model 2002, "Two–Way Travel Drawer Slide", 1990.

Primary Examiner—Jose V. Chen
Assistant Examiner—Hanh V. Tran
Attorney, Agent, or Firm—Bruce & McCoy

[57] ABSTRACT

A universal travel slide for two-way drawer travel including a pair of slide rails which are secured to the drawer and the cabinet and are interconnected by a sabot which permits the rails to reciprocate with respect to each other.

9 Claims, 2 Drawing Sheets

UNIVERSAL TRAVEL SLIDE

BACKGROUND OF THE INVENTION

1. Field of the Invention

The present invention relates to drawer slides and, more particularly, to a universal travel slide which operates in two directions to permit a drawer to be drawn out from either side of a cabinet. A variation of the universal travel slide of the present invention permits a drawer or table top to be fully withdrawn from the cabinet to a projecting extension in cantilever configuration. In both variations, an important feature of the new design is that the slide mechanism can be concealed in the cabinetry more completely than any of the presently available two-way drawer slide designs.

2. Description of the Prior Art

There are several two-way travel drawer slides in the prior art and presently on the market. In most designs, it is necessary to provide a notch in the drawer face to permit the slide mechanism to function as a two-way slide.

The present invention eliminates the need for providing cut-outs and recesses in the drawer face panel and permits a hidden drawer slide to be utilized for fine furniture.

SUMMARY OF THE INVENTION

The present invention is a universal travel, two-way drawer slide that comprises a pair of parallel slide rails, each of which has a pair of opposed recessed parallel grooves formed in the rail. A pair of sabots interconnects the slide rails. Each of the sabots has two pairs of projecting bearing members which are captured in sliding relation in one of the slide rails in the opposed grooves thereof. This permits the sabots to slide with respect to each of the slide rails, and the slide rails can reciprocate longitudinally with respect to each other. Stops are disposed at each end of the slide rails and prevent the sabots from sliding out of engagement with the rails. Detents are formed in the slide rails at opposite ends thereof, and a reciprocating bolt is disposed in each of the sabots. The bolt is formed for engaging alternately the detents in the opposing slide rails as the rails are reciprocated longitudinally with respect to each other.

OBJECTS OF THE INVENTION

It is therefore an important object of the present invention to provide an improved two-way travel slide for drawers.

It is another object of the present invention to provide a hidden two-way travel slide for drawers.

It is a further object of the present invention to provide a universal slide for drawers which can be ganged to permit a cantilever extension of a drawer or table top.

Other objects and advantages of the present invention will become apparent when the apparatus of the present invention is considered in conjunction with the accompanying drawings.

DESCRIPTION OF THE PREFERRED EMBODIMENT

Reference is made to the drawings for a description of the preferred embodiment of the present invention wherein like reference numbers represent like elements on corresponding views.

The universal travel slide of the present invention is designed to be hidden in furniture in cabinetry to provide the least intrusion on the esthetics of the cabinetry design. It has the additional capability of being ganged, assembled in multiples, whereby it can be used to support a drawer, cutting board, or table top in extended cantilever position. This capability is possible due to the unique characteristics of the universal travel slide design.

Figure 1:
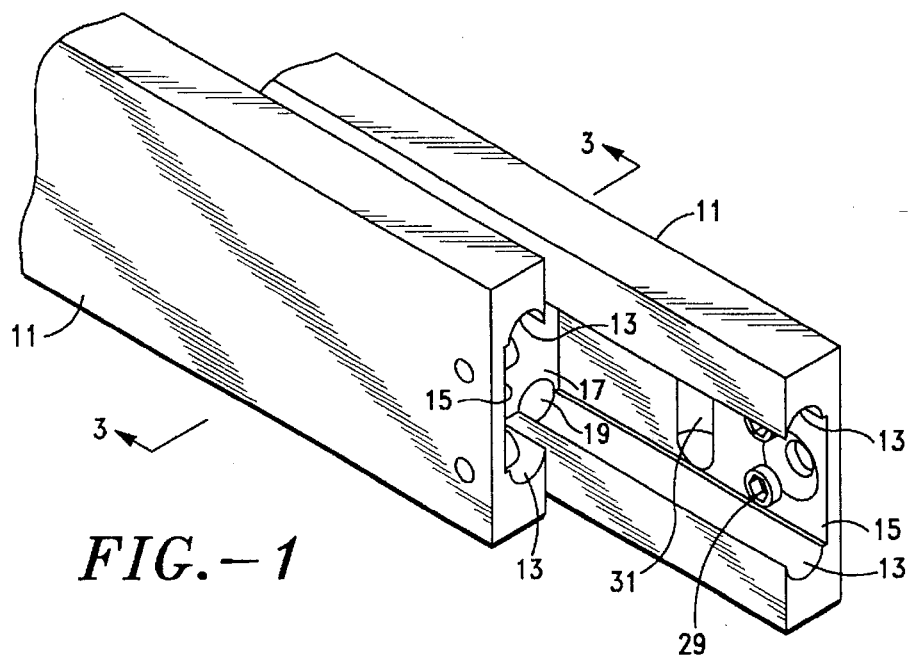
FIG. 1 is a perspective view of one end of a two-way drawer slide of the present invention.
Figure 2:
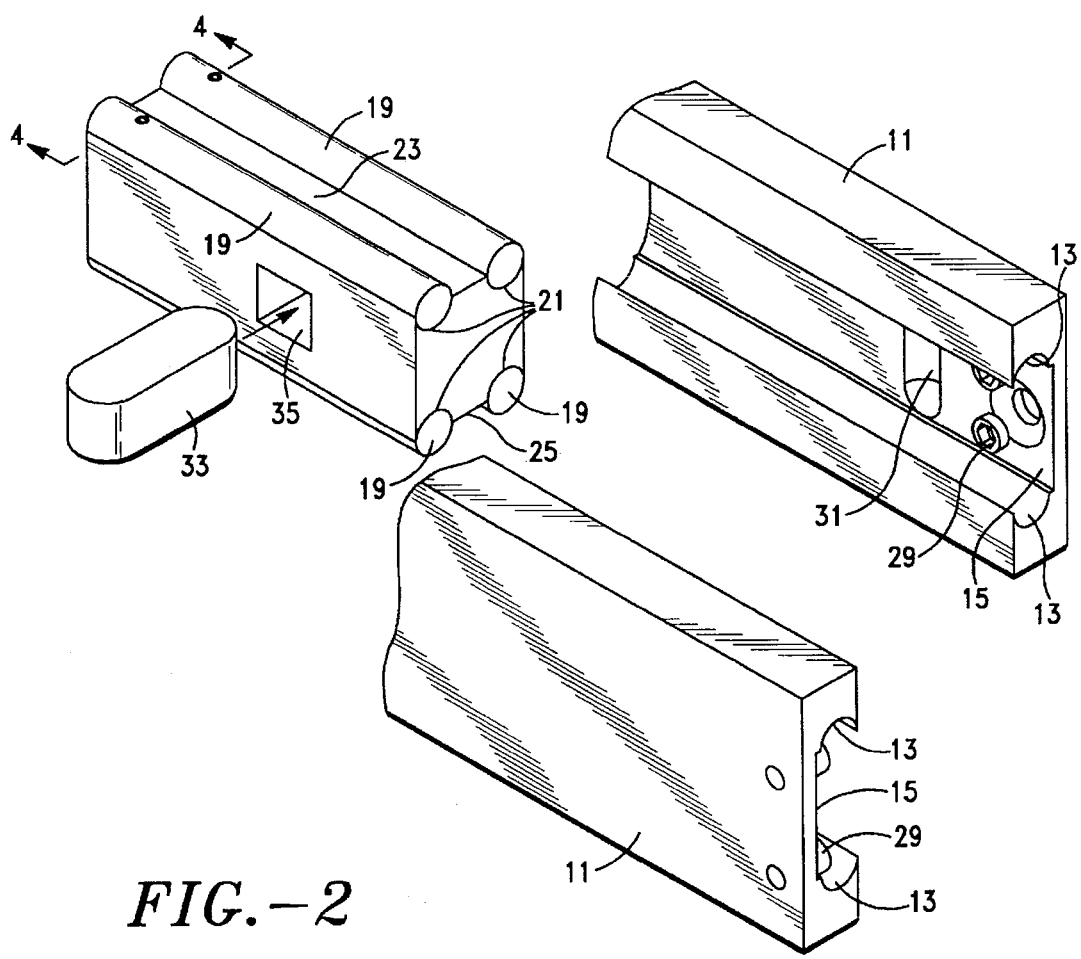
FIG. 2 is an exploded view thereof.

Reference is made to FIGS. 1 and 2 of the drawings which show one end of the drawer slide which is duplicated at the other end thereof.

The basic elements of the slide include a pair of parallel slide rails 11 which are interconnected and permit reciprocation in either direction with respect to each other. Each of the rails has a pair of opposed recessed parallel grooves 13 formed integral to the rails. In a preferred embodiment of the invention, each slide rail is a single integral element forming a channel having opposing grooves formed therein. The rail can be formed from a piece of rectangular cross-section metal bar stock such as aluminum with the channel 15 milled longitudinally in one side thereof. The edges of the channel are undercut to form the opposing grooves.

In a simpler construction of the slide rails, a piece of flat steel bar stock can have the longitudinal edges rolled into overhanging flanges forming the opposing grooves. This latter embodiment is used in many common drawer slides and has a single roller wheel captured between the opposing grooves. In the present invention, the opposing grooves capture a pair of bearing members which slide in the grooves.

A pair of sabots 17 disposed at opposite ends of the slide rails 11 are utilized to interconnect the rails. The sabots are elongated and generally square in cross-section. Each of the sabots has two pairs of projecting bearing members 19 which are captured in the slide rail grooves 13 in sliding relation whereby the sabots can slide with respect to each of the rails. In a preferred embodiment, each of the bearing members is hemispherical in cross-section. This arrangement of the sliding relation of the sabot bearing members in the slide rail grooves allows the two rails to reciprocate longitudinally with respect to each other.

Figure 3:
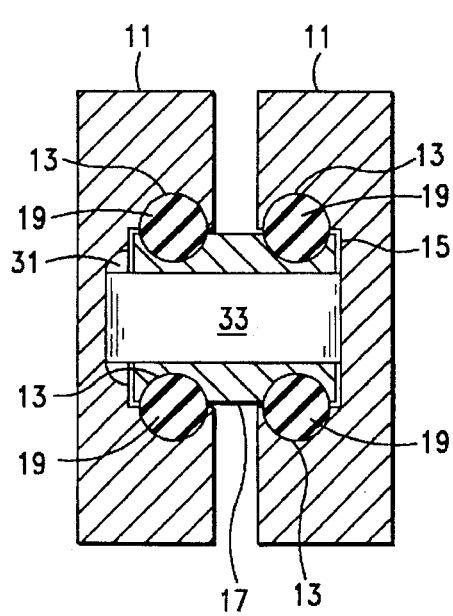
FIG. 3 is a cross-section view taken along lines 3—3 of FIG. 1.
Figure 4:
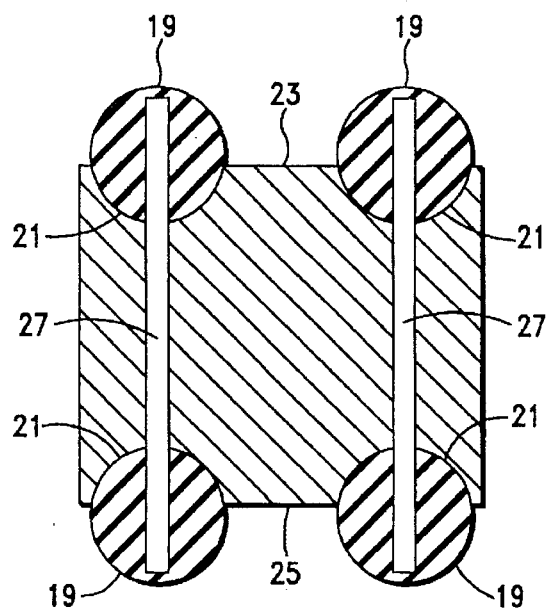
FIG. 4 is a cross-section view taken along lines 4—4 of FIG. 2.
Figure 5:
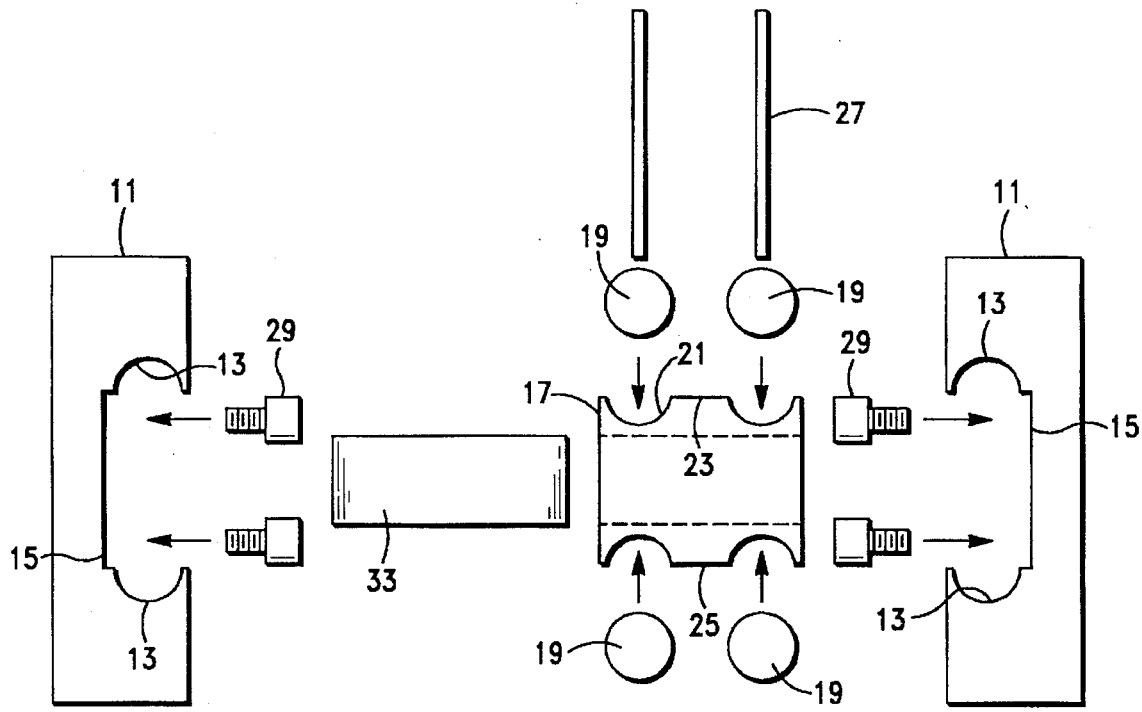
FIG. 5 is an exploded end view of FIG. 1.

Reference is made to FIGS. 3–5. The two bearing members 19 are integral to the sabot 17 but can be formed as independent elements secured to the sabot. In a preferred embodiment of the invention, each of the sabots includes two pairs of parallel restraining grooves 21 disposed in opposing relation to each of the grooves 13 in the slide rails 11. The bearing members 19 are secured in each of the restraining grooves of the sabots, and the same bearing members are also captured in sliding relation in the opposing grooves 13 in the slide rails. The two pairs of grooves of the sabots are formed on two opposite elongated sides 23, 25 thereof. The grooves are disposed proximate to each of the edges of the respective sides and the bearing members are secured in the grooves.

The bearing members 19 are generally elongated teflon cylinders having one-half of the cylindrical shape imbedded in the sabot groove 21 and one-half of the cylindrical shape projecting from the sabot forming the semi-cylindrical configuration of the bearing member which is hemispherical in cross-section. In lighter duty applications, it is possible that the whole sabot 17 could be made of extruded teflon cut to length. Similarly, any other configuration of bearing member can be utilized and provided on the corners of the cross-section of the sabot for engaging the slide rails 11.

In the preferred embodiment of the invention, the teflon cylinder bearing members 19 are held in the grooves 21 of the sabots 17 by spring pins 27. The pins project through the body of the sabot and extend part way into each of the bearing members which are captured in the opposing grooves of one of the slide rails. Spring pins are tubular elements with a slit along one side whereby the diameter of the pins can be compressed when a pin is inserted into a hole and then the pressure released to allow the pin to expand and lock in the hole. A single spring pin has proven sufficient for restraining each pair of bearing members. Each pin is captured between the walls of the slide rail opposing grooves and projects into the two bearing members and through the sabot.

Reference is made to FIGS. 1, 2 and 5. Stops 29 are provided on the slide rails 11 disposed at each end thereof to prevent the sabots 17 from sliding out of engagement with the rails. In the preferred embodiment, simple screwed-in stops are accurately located near the ends of the rails internally of the channel formed in the rail. The rails can be provided with recessed holes to permit the rails to be secured to the cabinetry.

Detents 31 are formed in the slide rails 11 at opposite ends thereof internally of the channel wall between the grooves 13. The detents are located a predetermined distance from the slide stops 29 which is determined by the configuration of the sabot.

A reciprocating bolt 33 is disposed in each of the sabots 17 and is formed for engaging alternately the detents 31 in the opposing slide rails 11 as the rails are reciprocated longitudinally with respect to each other. The bolts are of a specific length which is defined by the distance between the opposing walls of the channels in the slide rails plus the depth of one of the detents less a small mount for clearance. Each bolt extends cross-wise to the sabot through a hole 35 located generally mid-length thereof. The bolt projects through the two sides of the sabot not containing the grooves 21 which retain the bearing members 19. The bolts are preferably made rectangular in cross-section to provide a larger contact area with the detents in the slide rail channel walls. In the preferred embodiment, the reciprocating bolts in the sabots are made of teflon and are provided with rounded ends for engaging the detents in the slide rails. The detents Likewise are provided with sloped sides for forcing the bolts out of the detents as the sabots are moved laterally along the channel with respect to the detents. The bolts are disposed cross-wise to the sabots and project into the detents in the slide rails.

The stops 29 and the detents 31 in the same slide rail are positioned with respect to the ends of the rail and each other whereby as the proximate sabot 17 abuts the stop, the bolt 33 in the sabot reciprocates to engage the respective detent 31 when the slide rails are reciprocated with respect to each other. This means that the distance of the placement of the stops from the centerline of the detents is approximately equal to the distance from the end of the sabot which contacts the stop to the centerline of the bolt. As the slide rails are reciprocated, the sabots engage the respective detents and move toward or away from each other depending upon which detents they are engaged with. At the maximum extension of the slide rails with respect to each other, the sabots are abutting.

The uniqueness of the design of the present invention is derived from the fact that the slide can be more completely concealed by the cabinetry of its employment than the two-way slides of the prior art. As a result of the sabots providing strength to the slide at full extension, only the slide rail of the pair that is attached to the moving element, the drawer or table top work surface, extends beyond the cabinetry which houses the moving element. The other slide rail remains fully enclosed in the cabinetry. Thus, no notches need to be placed in the panel face of the drawer.

The universal travel slide of the present invention can also be connected in gangs for extended cantilever projection. The purpose is to permit a drawer, or cutting board, or a table top working surface, to be withdrawn from a cabinet a longer distance than a normal drawer slide is capable of permitting. This is accomplished by securing two or more sets of slides in series by securing the slide rails together adjacent their ends. The arrangement eliminates the two-way slide capability of the invention, but permits long extensions with great strength in the slide mechanism for permitting cantilever support for drawers and work surfaces which can be concealed in a cabinet and withdrawn from the cabinet to their full depth or even a greater distance (provided the cabinet is properly counterweighted) based on the number of slide pairs that are ganged in series. These slides can be mounted under the drawer or working surface.

Alternatively, the universal slide of the present invention is so adaptable in its utility that it can simply be mounted under a drawer without alteration. Simply, different surfaces of the slide rails are attached to the drawer and its cabinet. Still more uniqueness arises from the fact that the two-way slides of the present invention are so universal that they can be turned 90 degrees on their sides and still function as a drawer slide; again, simply by altering winch surfaces of the slide rails are attached to the cabinet and the drawer, either at the side of the drawer or mounted underneath.

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

We claim:

1. A universal travel slide comprising
   a pair of parallel opposing slide rails, each of said rails having a pair of opposed recessed parallel grooves formed therein,
   a pair of sabots interconnecting said slide rails, each of said sabots having two pairs of projecting bearing members, each of said pairs of said bearing members being captured in sliding relation in one of said slide rails in the opposed grooves thereof whereby said sabots can slide in said grooves with respect to each of said rails and said slide rails can reciprocate longitudinally with respect to each other,
   stops disposed at each end of said slide rails preventing said sabots from sliding out of engagement therewith,
   detents formed in said slide rails at opposite ends thereof, and
   a reciprocating bolt disposed in each of said sabots and formed for engaging alternatively said detents in said opposing slide rails as said rails are reciprocated longitudinally with respect to each other.

2. The universal travel slide of claim 1 wherein each of said sabots includes two pairs of parallel restraining grooves disposed in opposing relation to said grooves in said slide rails, and bearing members captured in each of said grooves of said sabots, said bearing members also being captured in sliding relation in said opposing grooves of said slide rails whereby said sabots can slide longitudinally therein.

3. The universal travel slide of claim 2 wherein said sabots are elongated and generally square in cross-section and said two pairs of grooves thereof are formed on two opposite elongated sides thereof proximate each of the edges of the respective sides, said bearing members are secured in said grooves, and a hole is formed through said sabots, intersecting the sides not containing said pairs of grooves, for containing said reciprocating bolts.

4. The universal travel slide of claim 1 wherein each of said slide rails is a single integral element forming a channel having said opposing grooves formed for capturing a cylindrical bearing member, and said sabots are provided with four bearing members having a cylindrical configuration for engaging said grooves in said channels in sliding relation.

5. The universal travel slide of claim 4 wherein said sabots are elongated, and said bearing members are semi-cylindrical in external configuration.

6. The universal travel slide of claim 1 wherein said stops and said detents in the same slide rails are positioned with respect to the ends of said rails whereby as the proximate sabot abuts said stop, said bolt in said sabot reciprocates to engage the respective detent when the slide rails are reciprocated with respect to each other.

7. The universal travel slide of claim 1 wherein said reciprocating bolts in said sabots are provided with rounded ends for engaging said detents in said slide rails, and said detents in said slide rails are provided with sloped sides for moving said bolts out of said detents as said sabots are moved laterally with respect to said detents.

8. A universal travel slide comprising a pair of parallel opposing slide rails, each of said rails being a single integral element forming a channel having opposing grooves, each of said grooves being formed for capturing a bearing member having a cylindrical configuration, a pair of elongated sabots, having generally square cross-sections, interconnecting said slide rails, each of said sabots having two pairs of bearing members having cylindrical configuration, each of said pairs of said bearing members being formed for engaging the grooves of one of said channels in said slide rails whereby said sabots can slide with respect to each of said slide rails and said slide rails can reciprocate longitudinally with respect to each other, stops disposed at each end of said slide rails preventing said sabots from sliding out of engagement therewith, detents formed in said slide rails at opposite ends thereof, and a reciprocating bolt disposed in each of said sabots and formed for engaging alternately said detents in said opposing slide rails as said rails are reciprocated longitudinally with respect to each other, said stops and said detents in the same slide rail being positioned with respect to the ends of said rails whereby as the proximate sabot abuts said stop, said bolt in said sabot reciprocates to engage the respective detent when the slide rails are reciprocated with respect to each other.

9. The universal travel slide of claim 1 wherein a multiple of sabots and rails are interconnected for multiple slide cantilever extension.

* * * * *